(12) United States Patent
Renwick et al.

(10) Patent No.: US 11,860,690 B2
(45) Date of Patent: Jan. 2, 2024

(54) CLAMPING SYSTEM FOR A COMPUTER PERIPHERAL DEVICE

(71) Applicant: Logitech Europe S.A.

(72) Inventors: James Edward Renwick, Portland, CA (US); Adam Bennett, North Bend, WA (US); Steven Takayama, Lausanne (CH); Branko Lukic, Emerald Hills, CA (US); Homin Lee, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 23 days.

(21) Appl. No.: 17/381,995

(22) Filed: Jul. 21, 2021

(65) Prior Publication Data

US 2023/0027043 A1    Jan. 26, 2023

(51) Int. Cl.
*F16M 11/00* (2006.01)
*G06F 1/16* (2006.01)
*F16M 13/02* (2006.01)

(52) U.S. Cl.
CPC ......... *G06F 1/1607* (2013.01); *F16M 13/022* (2013.01); *F16M 2200/066* (2013.01)

(58) Field of Classification Search
CPC ............... G06F 1/1607; F16M 13/022; F16M 2200/066
See application file for complete search history.

(56) References Cited

U.S. PATENT DOCUMENTS

| | | | | |
|---|---|---|---|---|
| 2,568,233 A * | 9/1951 | Hamilton | ................. | B25B 5/10 248/228.1 |
| 4,832,299 A * | 5/1989 | Gorton | .................. | F16M 11/10 403/92 |
| 5,427,364 A * | 6/1995 | Zborschil | ................. | B25B 5/16 269/166 |
| 5,938,158 A * | 8/1999 | Tisbo | ..................... | A47B 21/02 248/228.3 |
| 6,672,553 B1 * | 1/2004 | Lin | .................... | F16M 11/2064 248/921 |
| 7,195,215 B2 * | 3/2007 | Lin | ........................ | F16M 11/28 248/125.9 |
| 8,794,579 B2 * | 8/2014 | Sturman | .............. | F16M 11/041 248/921 |
| D766,075 S * | 9/2016 | Milbank | ................ | F16M 11/16 D8/394 |
| 10,571,071 B2 * | 2/2020 | Hung | ...................... | F16B 2/065 |
| 10,851,938 B2 * | 12/2020 | Glickstein | .............. | F16M 11/16 |
| 10,875,156 B2 * | 12/2020 | Wang | ..................... | B25B 5/003 |

* cited by examiner

*Primary Examiner* — Amy J. Sterling
(74) *Attorney, Agent, or Firm* — KILPATRICK TOWNSEND & STOCKTON LLP

(57) ABSTRACT

In some embodiments, a computer peripheral mounting device for connecting a peripheral device to a support, wherein the support defines a thickness, comprises a fixed tubing extending in a longitudinal direction; a clamp coupled to a first end of the fixed tubing; an adjustment mechanism positioned at a second end of the fixed tubing, opposite the first end, and a shaft positioned within the fixed tubing and coupled between the adjustment mechanism and the clamp, wherein the adjustment mechanism is configured to rotate around the longitudinal direction relative to the fixed tubing in order to rotate the shaft within the fixed tubing and without the adjustment mechanism nor the shaft translating along the longitudinal direction relative to the fixed tubing, and wherein rotation of the shaft is configured to cause the distance between the first surface and the second surface to change.

10 Claims, 7 Drawing Sheets

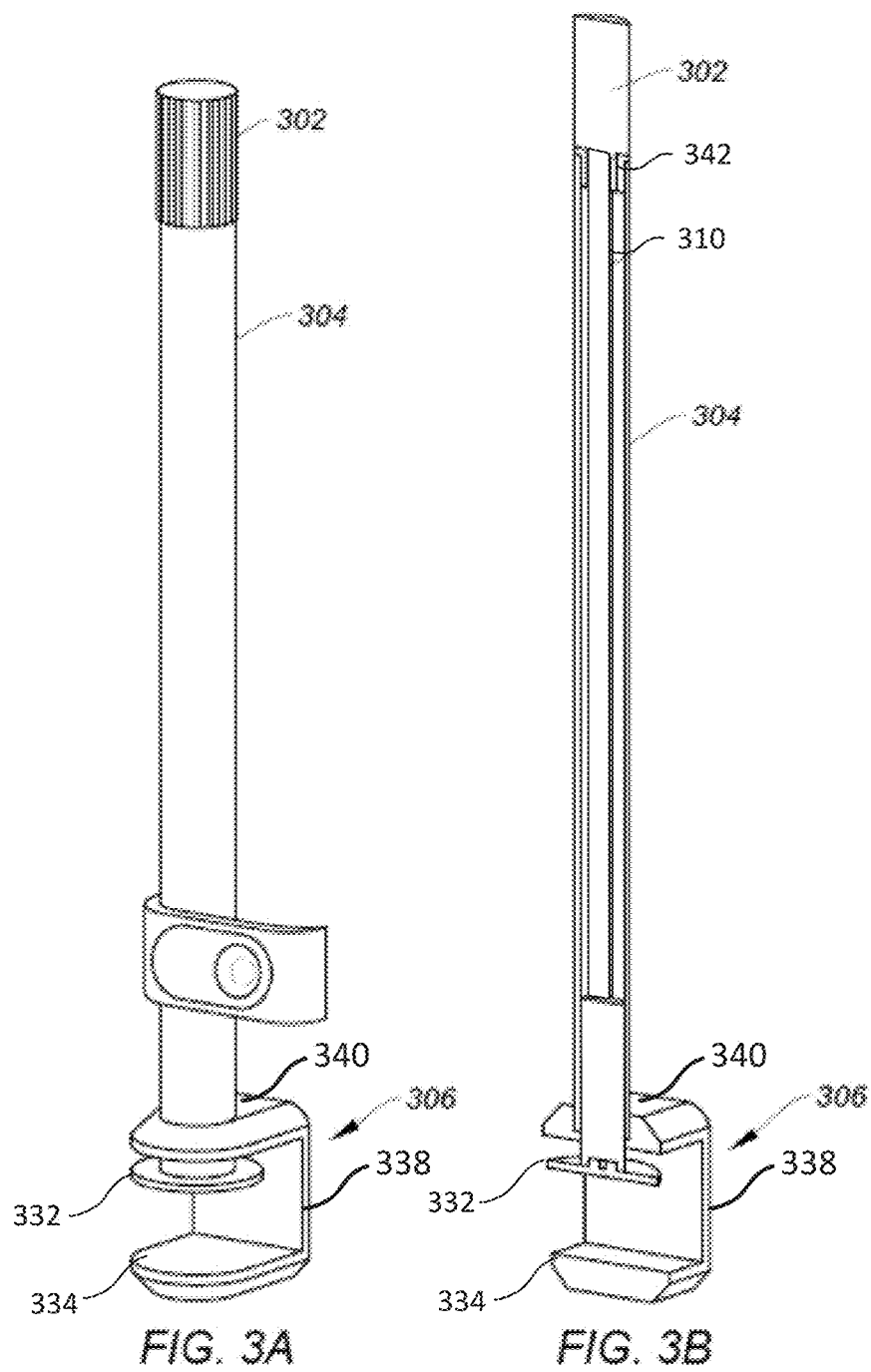

CLAMPING SYSTEM FOR A COMPUTER PERIPHERAL DEVICE

BACKGROUND

Digital content streamers and creators often work at a desk space with monitors and extra computer peripheral devices. They include cameras, lighting devices, microphones, speakers, keyboards. Computer peripheral devices can be mounted to the desk space using mounting systems with a table clamp. However, the mounting systems for the peripheral devices are often bulky and mechanisms for adjusting the table clamp are often difficult to access and manipulate from the user's position in the desk space. Improvements in table clamp adjustment systems are needed to provide users easier access for adjusting and securing the system.

BRIEF SUMMARY

In certain embodiments, a computer peripheral mounting device for connecting a peripheral device to an underlying surface, wherein the underlying surface defines a thickness, may comprise: a fixed tubing extending in a longitudinal direction; a clamp coupled to a first end of the fixed tubing, wherein the clamp comprises a first surface and a second surface, and wherein a distance in the longitudinal direction between the first surface and the second surface is configured to be changed from a first distance to a second distance, less than the first distance, in order to clamp the thickness of the underlying surface between the first surface and the second surface; an adjustment mechanism positioned at a second end of the fixed tubing, opposite the first end, and a shaft positioned within the fixed tubing and coupled between the adjustment mechanism and the clamp, wherein the adjustment mechanism is configured to rotate around the longitudinal direction relative to the fixed tubing in order to rotate the shaft within the fixed tubing and without the adjustment mechanism nor the shaft translating along the longitudinal direction relative to the fixed tubing, and wherein rotation of the shaft is configured to cause the distance between the first surface and the second surface to change. The computer peripheral mounting device may further include a horizontal support coupled to the fixed tubing between the adjustment mechanism and the table clamp. The horizontal support can be translatable along the fixed tubing between the adjustment mechanism and the table clamp and fixable to the fixed tubing by a coupling element. The horizontal support may further comprise an attachment mechanism for a peripheral device. An upper surface of the adjustment mechanism can comprise an attachment mechanism for a peripheral device. The attachment mechanism can comprise a ¼-20 adapter. In some embodiments, the first surface faces away from the adjustment mechanism, and the second surface faces toward the adjustment mechanism, and rotation of the shaft causes the first surface to translate in a direction along the longitudinal direction relative to the adjustment mechanism. In some embodiments, the first surface faces away from the adjustment mechanism, and the second surface faces toward the adjustment mechanism, and rotation of the shaft causes the second surface to translate in a direction along the longitudinal direction relative to the adjustment mechanism. The table clamp may include a macro-adjustment mechanism and the adjustment mechanism comprises a micro-adjustment mechanism for the table clamp.

In some embodiments, a method for connecting a peripheral device to an underlying surface, wherein the underlying surface defines a thickness, may comprise: receiving a rotation of an adjustment mechanism that is coupled to a second end of a fixed tubing extending in a longitudinal direction; and adjusting a distance in the longitudinal direction between a first surface of a clamp and a second surface of the clamp coupled to a first end, opposite the second end, of the fixed tubing from a first distance to a second distance, less than the first distance, in order to clamp the thickness of the underlying surface between the first surface and the second surface based on the rotation of the adjustment mechanism, around the longitudinal direction relative to the fixed tubing in order to rotate a shaft positioned within the fixed tubing and coupled between the adjustment mechanism and the clamp and without the adjustment mechanism nor the shaft translating along the longitudinal direction relative to the fixed tubing. The fixed tubing may comprise a horizontal support coupled to the fixed tubing between the adjustment mechanism and the table clamp and the method further may comprise receiving a translation of the horizontal support along the fixed tubing. The horizontal support may include an attachment mechanism for a peripheral device. An upper surface of the adjustment mechanism may include an attachment mechanism for a peripheral device. The attachment mechanism may comprise a ¼-20 adapter. In some embodiments, the first surface faces away from the adjustment mechanism, and the second surface faces toward the adjustment mechanism, and rotation of the shaft causes the first surface to translate in a direction along the longitudinal direction relative to the adjustment mechanism. In some embodiments, the first surface faces away from the adjustment mechanism, and the second surface faces toward the adjustment mechanism, and rotation of the shaft causes the second surface to translate in a direction along the longitudinal direction relative to the adjustment mechanism. The table clamp may comprise a macro-adjustment mechanism and the adjustment mechanism comprises a micro-adjustment mechanism for the table clamp.

In some embodiments, a computer peripheral mounting apparatus for connecting a peripheral device to an underlying surface, wherein the underlying surface defines a thickness, may comprise: a fixed tubing extending in a longitudinal direction; a clamp coupled to a first end of the fixed tubing, wherein the clamp comprises a first surface and a second surface, and wherein a distance in the longitudinal direction between the first surface and the second surface is configured to be changed from a first distance to a second distance, less than the first distance, in order to clamp the thickness of the underlying surface between the first surface and the second surface; an adjustment mechanism positioned at a second end of the fixed tubing, opposite the first end; a horizontal support coupled to the fixed tubing between the adjustment mechanism and the clamp, and a shaft positioned within the fixed tubing and coupled between the adjustment mechanism and the clamp, wherein the adjustment mechanism is configured to rotate around the longitudinal direction relative to the fixed tubing in order to rotate the shaft within the fixed tubing and without the adjustment mechanism nor the shaft translating along the longitudinal direction relative to the fixed tubing, and wherein rotation of the shaft is configured to cause the distance between the first surface and the second surface to change. The horizontal support may be translatable along the fixed tubing between the adjustment mechanism and the table clamp and fixable to the fixed tubing by a coupling element. The horizontal support may comprise an attachment mechanism for a peripheral device.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 3A shows another example of a clamping system, according to certain embodiments;

FIG. 3B shows another example of a section view of a clamping system, according to certain embodiments;

DETAILED DESCRIPTION

Figure 1:
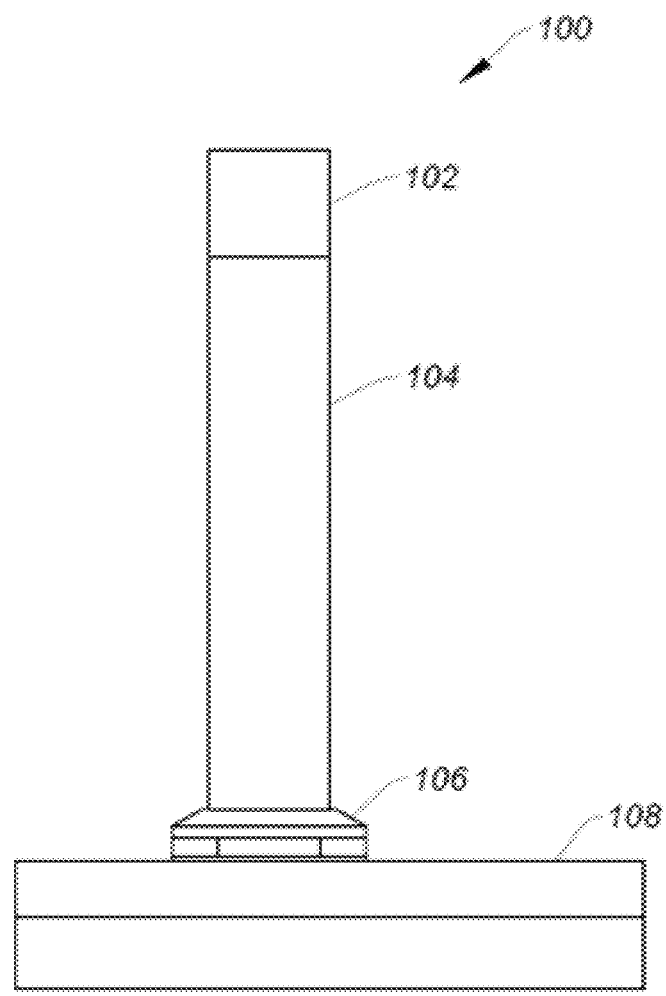
FIG. 1 shows an example of a front view of a clamping system for a computer peripheral device, according to certain embodiments.

Aspects of the present disclosure relate generally to computer peripheral devices, and more particularly to a table clamp adjustment system for computer peripheral devices, according to certain embodiments.

In the following description, various examples of the table clamp adjustment system are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Many of the embodiments relate to novel table clamp systems that can be configured to be fixed to an underlying surface (e.g., a table). The table clamp system can include an adjustment mechanism at a first end of the system and a clamp at a second end that can be fixed to the underlying surface at the bottom of the system. The adjustment mechanism can be manipulated (e.g., rotated) to change a distance between a first surface and a second surface of the clamp. An intermediate portion of the system between the adjustment mechanism and the clamp can receive and couple horizontal supports. Lighting devices, cameras, microphones, or other devices can be referred to generally as "computer peripheral devices" throughout this disclosure. Computer peripheral devices can be coupled to the horizontal supports and positioned around other objects that are located on the underlying surface, such as computer monitors. The horizontal supports can be translated along the intermediate portion and fixed at a desired position using a coupling element.

In some embodiments, the concepts described above can be implemented, for instance, by a computer peripheral mounting device comprising a fixed tubing extending in a longitudinal direction and a clamp coupled to a first end of the fixed tubing. The clamp can include a first surface and a second surface that can face in opposite directions in order to clamp a thickness of an underlying surface between the first surface and the second surface. The computer peripheral mounting device can also include an adjustment mechanism positioned at a second end of the fixed tubing, opposite the first end, and a shaft positioned within the fixed tubing and coupled between the adjustment mechanism and the clamp. The adjustment system may be configured to rotate around the longitudinal direction relative to the fixed tubing in order to rotate the shaft within the fixed tubing and without the adjustment mechanism nor the shaft translating along the longitudinal direction relative to the fixed tubing. Rotation of the shaft can cause the distance between the first surface and the second surface to change. Rotation of the shaft may cause either the first surface or the second surface to translate in the longitudinal direction relative to the adjustment mechanism.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

Embodiments of a Table Clamp System

FIG. 1 shows an example of a front view of a clamping system 100 for a computer peripheral device, according to certain embodiments. The clamping system 100 can include a clamp 106 coupled to a first end of a fixed tubing 104 that is adjustable to be fixed to an underlying surface 108. The clamp 106 can be adjusted by an adjustment mechanism 102 that is positioned at a second end of the fixed tubing 104. A portion of the fixed tubing 104 between the adjustment mechanism 102 and the clamp 106 may have a length greater than a predefined amount (e.g., 20 cm).

As the adjustment mechanism 102 is manipulated, such as rotated, a distance between a first surface and a second surface of the clamp 106 can be changed in order to clamp the thickness of an underlying surface 108 between the first surface and the second surface. For example, rotating the adjustment mechanism 102 in a first direction (e.g., right) may result in the distance decreasing, and rotating the adjustment mechanism 102 in a second direction (e.g., left) may result in the size of the opening of the clamp 106 increasing. For example, the thickness of the underlying surface 108 may be 5 cm, and the clamp 106 can have a maximum opening size of 15 cm and a minimum opening size of 0 cm. Thus, the adjustment mechanism 102 coupled to the second end of the fixed tubing 104 can be manipulated until the size of the opening of the clamp 106 is 5 cm, so that the clamp 106 can be fixed to the underlying surface 108.

The positioning of the adjustment mechanism 102 at the top of the fixed tubing 104 can provide easy access for fixing the clamping system 100 to the underlying surface 108. This may be particularly beneficial if the underlying surface 108 has additional equipment, such as computer monitors and a keyboard, positioned on it as well.

The majority of the embodiments described herein generally refer to the underlying surface 108 as a table, however it should be understood that an underlying can be any suitable surface that can receive a clamping system that may be used, for example, to couple to horizontal supports with computer peripheral devices for a monitor setup (e.g., a desktop space of digital steamers and creators).

Figure 2A:
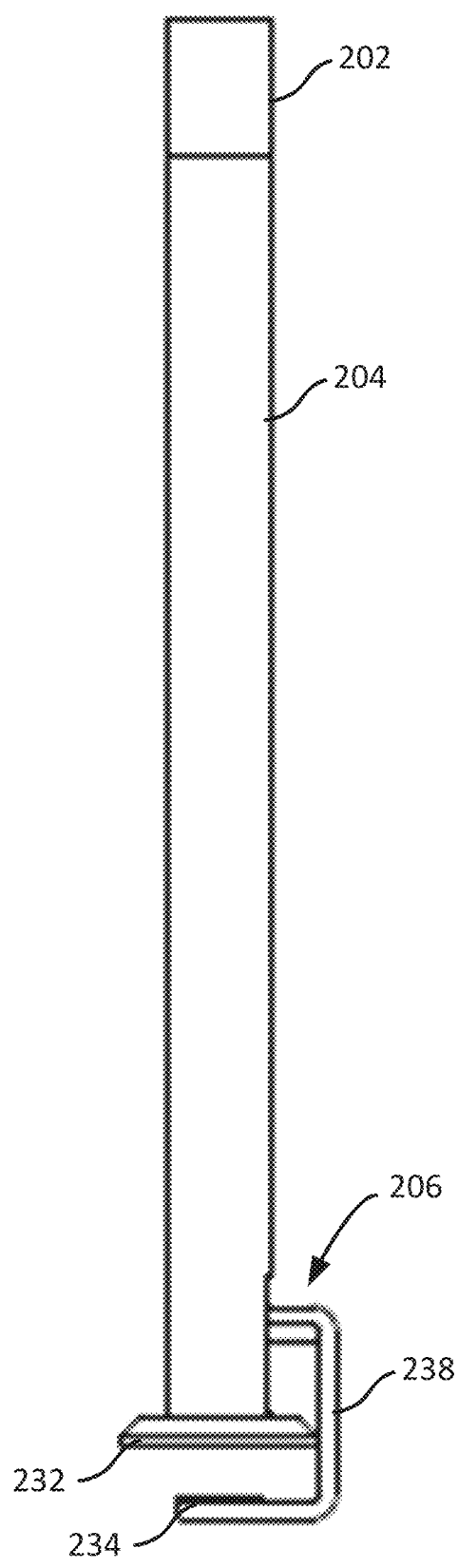
FIG. 2A shows an example of a clamping system, according to certain embodiments.
Figure 2B:
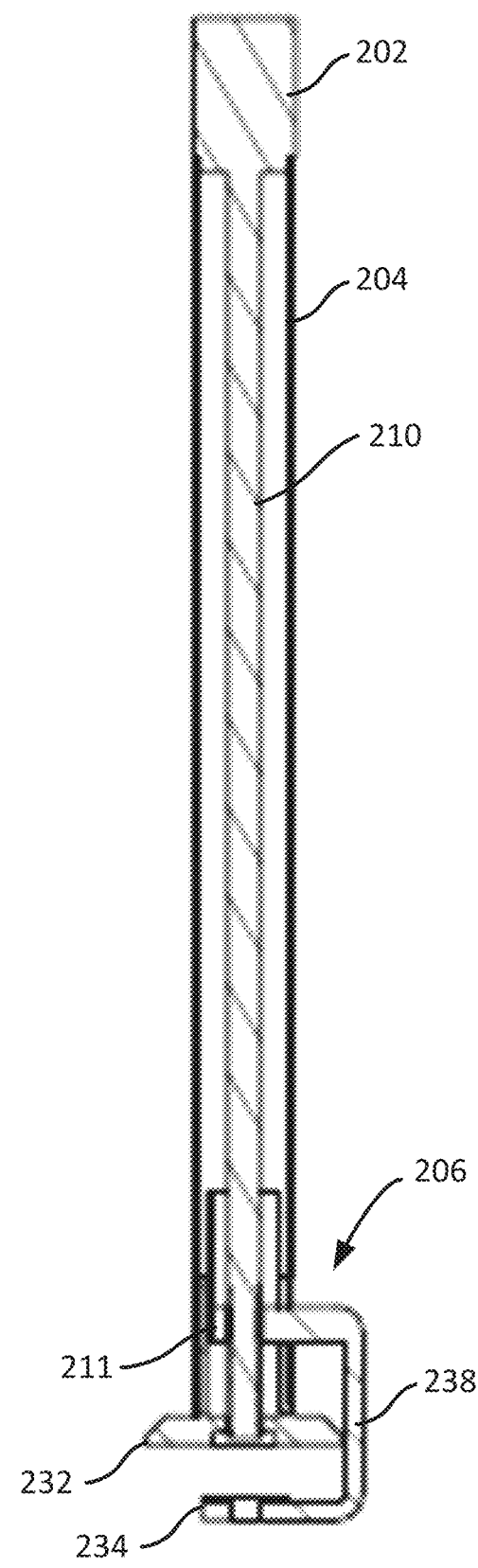
FIG. 2B shows an example of a section view of a clamping system, according to certain embodiments.
Figure 2C:
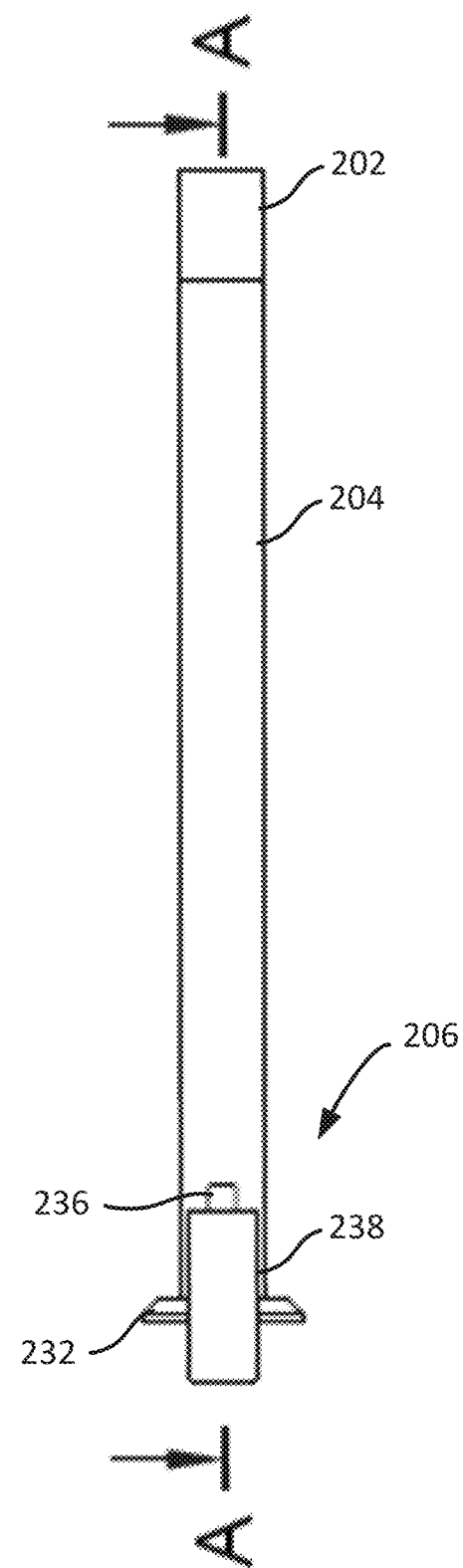
FIG. 2C shows an example of a back view of a clamping system, according to certain embodiments.

FIGS. 2A-2C show an example of a clamping system, such as the clamping system 100 in FIG. 1. FIG. 2A shows an external view of the clamping system, FIG. 2B shows a section view of the clamping system, and FIG. 2C shows a back view of the clamping system. The clamping system can include a clamp 206 that is coupleable to a first end of a fixed tubing 204 that extends in a longitudinal direction. The clamping system can also include an adjustment mechanism 202 that is coupleable to a second end of the fixed tubing 204 that is separated from the clamp 206 by a portion of the fixed tubing 204.

As shown in FIG. 2B, the clamping system can include a shaft 210 that is positioned within the fixed tubing 204 and is coupled between the adjustment mechanism 202 and the clamp 206. A bushing, nut, or other feature may be coupled to a bottom surface of the adjustment mechanism 202 around the shaft 210 to provide a secure clamping of the clamping system. Manipulation of the adjustment mechanism 202 can cause the adjustment mechanism 202 to rotate around the longitudinal direction relative to the fixed tubing 204. Rotating the adjustment mechanism 202 can cause the shaft 210 to rotate within the fixed tubing 204 without the adjustment mechanism 202 nor the shaft 210 translating along the longitudinal direction relative to the fixed tubing 204. Rotation of the shaft 210 can cause a distance between a first surface 232 and a second surface 234 of the clamp 206 to change. The first surface 232 may face away from the adjustment mechanism 202, such that the first surface 232 is positioned on a top surface of the underlying surface, and the second surface 234 may face towards the adjustment mechanism 202, such that the second surface 234 is positioned on a bottom surface of the underlying surface.

A lower portion of the shaft 210 can include threads that can interact with a threaded element 211 of the clamp 206 to allow for the vertical translation of the second surface 234 in the longitudinal direction relative to the adjustment mechanism 202. The threaded element 211 can be positioned within an opening 236 (shown in FIG. 2C) of the fixed tubing 204 and extend around a diameter of the shaft 210 within the fixed tubing 204. The second surface 234 can translate in the longitudinal direction along a length of the opening 236 based on the rotation of the adjustment mechanism 202. The threaded element 211 may be a nut or other threaded component that can allow for translation of the second surface 234 and secure clamping of the clamping system. The threaded element 211, the second surface 234, and a vertical support 238 can make up a C-shaped arm of the clamp 206. The C-shaped arm can translate relative to the fixed tubing 204 based on the rotation of the adjustment mechanism 202.

In some embodiments, the clamp 206 can include a macro-adjustment mechanism (not shown) and the adjustment mechanism 202 can be a micro-adjustment mechanism for the clamp 206. The macro-adjustment mechanism may be adjustable by a monkey wrench, or other device, to provide coarse adjustment for the distance between the first surface 232 and the second surface 234 of the clamp 206. For example, the macro-adjustment mechanism may provide adjustment at centimeter increments, such that if the maximum opening size for the clamp 206 is 15 cm and the size of the opening is at 10 cm, a single manipulation of the macro-adjustment mechanism can change to size of the opening to 9 cm or 11 cm, depending on the direction of the manipulation. The adjustment mechanism 202 can then be adjusted for changes in the size of the opening that are smaller than the coarse-adjustment range (e.g., smaller than centimeter increments). As an example, if the macro-adjustment mechanism provides changes in centimeter increments, the adjustment mechanism 202 may provide changes in millimeter increments. As a result, the macro-adjustment mechanism may be used to set the distance between the first surface 232 and the second surface 234 at the closest setting greater than the thickness of the underlying surface, and the adjustment mechanism 202 may then be used to reduce the distance between the first surface 232 and the second surface 234 until the clamp 206 can be fixed to the underlying surface.

FIGS. 3A-3B shows another example of a clamping system, according to certain embodiments. FIG. 3A shows an external view of the clamping system and FIG. 3B shows a section view of the clamping system. The clamping system can include a clamp 306 that is coupleable to a first end of a fixed tubing 304 that extends in a longitudinal direction. The clamping system can also include an adjustment mechanism 302 that is coupleable to a second end of the fixed tubing 304 that is separated from the clamp 306 by a portion of the fixed tubing 304.

As shown in FIG. 3B, the clamping system can include a shaft 310 that is positioned within the fixed tubing 304 and is coupled between the adjustment mechanism 302 and the clamp 306. The shaft 310 may be coupled to the adjustment mechanism 302 by a nut 342, bushing, or another coupling element. The nut 342 can enable secure clamping of the clamping system. Another nut or coupling element may be coupled at the bottom of the shaft 310 within the fixed tubing 304 to further enable secure clamping of the clamping system. Manipulation of the adjustment mechanism 302 can cause the adjustment mechanism 302 to rotate around the longitudinal direction relative to the fixed tubing 304. Rotating the adjustment mechanism 302 can cause the shaft 310 to rotate within the fixed tubing 304 without the adjustment mechanism 302 nor the shaft 310 translating along the longitudinal direction relative to the fixed tubing 304. Rotation of the shaft 310 can cause a first surface 332 to translate in the longitudinal direction, causing a distance between the first surface 332 and a second surface 334 of the clamp 306 changes. The first surface 332 may face away from the adjustment mechanism 302, such that the first surface 332 is positioned on a top surface of the underlying surface, and the second surface 334 may face towards the adjustment mechanism 302, such that the second surface 334 is positioned on a bottom surface of the underlying surface. The fixed tubing 304 can remain stationary while the first surface 332 translates based on the manipulation of the adjustment mechanism 302, however an inner tube positioned between the fixed tubing 304 and the shaft 310 and coupled to the first surface 332 can translate based on the manipulation of the adjustment mechanism 302. An upper arm 340, the second surface 334, and a vertical support 338 can make up a C-shaped arm of the clamp 306. The C-shaped arm can be fixed relative to the fixed tubing 304.

Figure 4:
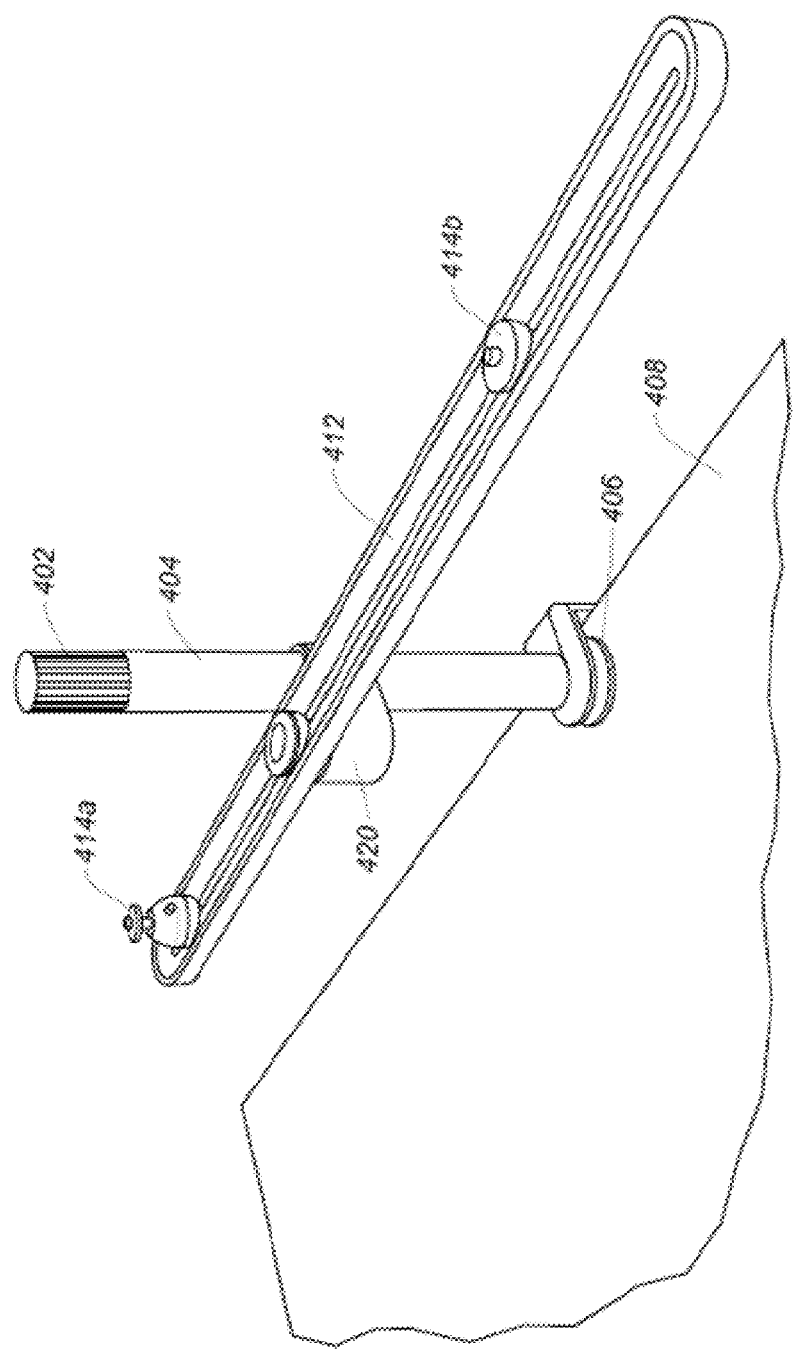
FIG. 4 shows an example of a clamping system with a horizontal support, according to certain embodiments.

FIG. 4 shows an example of a clamping system with a horizontal support 412, according to certain embodiments. The clamping system can be any of these described in FIGS. 1-3 with a clamp 406 coupled to a first end of a fixed tubing 404 and separated by an adjustment mechanism 402 that is coupled to a second end of the fixed tubing 404. The distance between a first surface and a second surface of the clamp 406 is adjustable by the adjustment mechanism 402, such that the clamping system can be fixed to an underlying surface 408.

In certain embodiments, the horizontal support 412 can be fixable to the fixed tubing 404 by a coupling element 420. The coupling element 420 can include a spring release, or other component, that allows the horizontal support 412 to be translated vertically along the fixed tubing 414 between the adjustment mechanism 402 and the clamp 406 and to stay fixed at a desired location of the fixed tubing 404. For example, the coupling element 420 can be released such that the horizontal support 412 can be positioned at an upper portion of the fixed tubing (e.g., closer to the adjustment mechanism 402 than the clamp 406). The coupling element 420 can then be engaged so that the horizontal support 412 remains positioned at the upper portion of the fixed tubing 404 without sliding down or otherwise translating along the fixed tubing 404. A shaft coupled within the fixed tubing 404 that causes adjustment of the clamp 406 can extend longitudinally through the translatable distance of the horizontal support 412. Thus, the horizontal support 412 can be coupled around the shaft.

In some embodiments, the fixed tubing 404 may include a channel that an internal feature of the coupling element 420 can fit into to prevent the coupling element 420 and the horizontal support 412 from rotating around the fixed tubing 404. However, it may be beneficial for the coupling element 420 to rotate around the fixed tubing 404 so that the horizontal support 412 can be positioned as desired.

The horizontal support 412 can include one or more attachment mechanisms 414a-b for peripheral devices. For example, the attachment mechanism 414a can be a spring release ¼-20 adapter and the attachment mechanism 414b can be spring tighten connector with a ¼-20 adapter. The attachment mechanisms 414a-b can be coupleable to computer peripheral devices. For example, the attachment mechanism 414a may be coupled to a lighting device and the attachment mechanism 414b may be coupled to a camera device. Additionally, an upper surface of the adjustment mechanism 402 may include an attachment mechanism (not shown) that can be coupled to a peripheral device.

The majority of the embodiments described herein generally refer to the coupling element 420 as coupling a single horizontal support to the fixed tubing 404. However, coupling elements may be able to couple to multiple horizontal supports simultaneously. In such examples, the coupling element can translate the multiple horizontal elements together along the fixed tubing.

Figure 5:
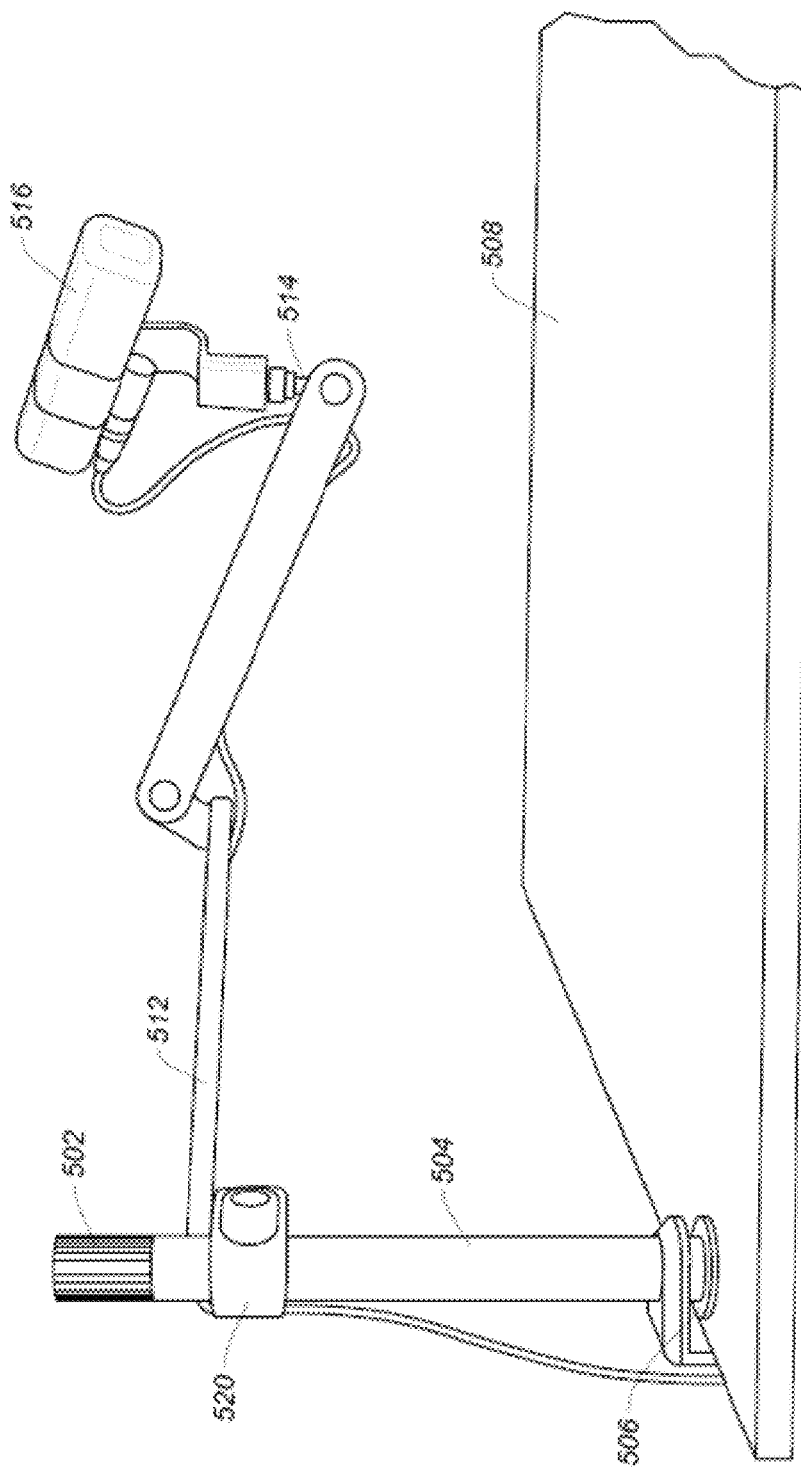
FIG. 5 shows another example of a clamping system with a horizontal support, according to certain embodiments.

FIG. 5 shows another example of a clamping system with a horizontal support 512, according to certain embodiment. The clamping system can be fixed to an underlying surface 508. The clamping system includes the horizontal support 512 coupled to a fixed tubing 504 between an adjustment mechanism 502 and a clamp 506. A coupling element 520 can couple the horizontal support 512 to the fixed tubing 504. The horizontal support 512 can be a gas assist arm with multiple portions. A first portion of the gas assist arm can be in one direction, while a second portion of the gas assist arm can be in a second direction. An attachment mechanism 514 (e.g., a ¼-20 adapter) can be coupled to a distant end of the second portion of the horizontal support 512. As a result, a peripheral device 516 coupled to the horizontal support 512 by the attachment mechanism 514 can be positioned as desired, which may involve being positioned around other objects on the underlying surface, such as one or more monitors or other computer equipment.

Figure 6:
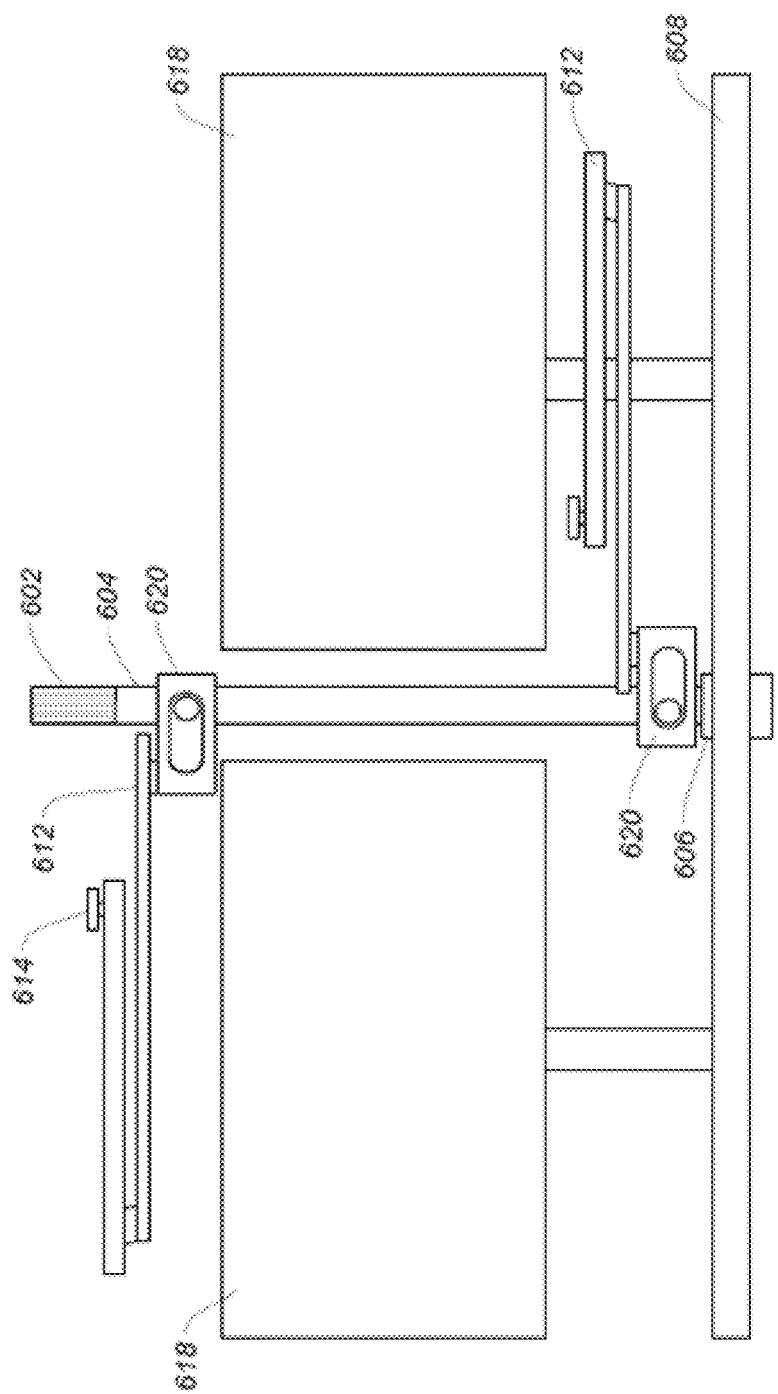
FIG. 6 shows a monitor setup with a clamping system and horizontal supports, according to certain embodiments.

FIG. 6 shows a monitor setup with a clamping system and horizontal supports 612, according to certain embodiments. The monitor setup includes two monitors 618, but a fewer number or greater number of monitors may be present in other examples. As shown, the horizontal supports 612 can be coupled to a fixed tubing 604 using coupling elements 620 at positions that do not interfere with a viewing area of the monitors 618. Additionally, an adjustment mechanism 602 coupled to a first end of the fixed tubing 604 can allow a user to conveniently adjust and fix a clamp 606 to an underlying surface 608 without having to navigate around the monitors 618. Instead, the user can reach over top of the monitors 618 to manipulate the adjustment mechanism 602 and change the size of the opening of the clamp 606 until it is of a desired size.

In some embodiments, each of the horizontal supports 612 can additionally include attachment mechanisms 614 for peripheral devices. For example, the attachment mechanism 614 on the upper horizontal support 612 may be coupled to a camera device, and the attachment mechanism 614 on the lower horizontal support may be coupled to a microphone device. This can allow the user to position the camera device and the microphone device as desired with respect to each other and the monitors 618.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, or other action "based on" one or more recited conditions or values may, in practice, be based on additional conditions or values beyond those recited.

What is claimed is:

1. A computer peripheral mounting device for connecting a peripheral device to an underlying surface, wherein the underlying surface defines a thickness, the computer peripheral mounting device comprising:
    a fixed tubing extending in a longitudinal direction;
    a clamp coupled to a first end of the fixed tubing, wherein the clamp comprises a first surface and a second surface, and wherein a distance in the longitudinal direction between the first surface and the second surface is configured to be changed from a first distance to a second distance, less than the first distance, in order to clamp the thickness of the underlying surface between the first surface and the second surface;
    an adjustment mechanism positioned at a second end of the fixed tubing, opposite the first end, and
    a shaft positioned within the fixed tubing and coupled between the adjustment mechanism and the clamp,
    wherein the adjustment mechanism is configured to rotate around the longitudinal direction relative to the fixed tubing in order to rotate the shaft within the fixed tubing and without the adjustment mechanism nor the shaft translating along the longitudinal direction relative to the fixed tubing, and
    wherein rotation of the shaft is configured to cause the distance between the first surface and the second surface to change; and
    a horizontal support coupled to the fixed tubing between the adjustment mechanism and the clamp,
    wherein the horizontal support comprises an attachment mechanism for a peripheral device.

2. The computer peripheral mounting device of claim 1, wherein the horizontal support is translatable along the fixed tubing between the adjustment mechanism and the clamp and fixable to the fixed tubing by a coupling element.

3. The computer peripheral mounting device of claim 1, wherein an upper surface of the adjustment mechanism comprises an attachment mechanism for a peripheral device.

4. The computer peripheral mounting device of claim 3, wherein the attachment mechanism comprises a ¼-20 adapter.

5. The computer peripheral mounting device of claim 1, wherein the first surface faces away from the adjustment mechanism, and the second surface faces toward the adjustment mechanism,
    wherein rotation of the shaft causes the first surface to translate in a direction along the longitudinal direction relative to the adjustment mechanism.

6. The computer peripheral mounting device of claim 1, wherein the first surface faces away from the adjustment mechanism, and the second surface faces toward the adjustment mechanism,
    wherein rotation of the shaft causes the second surface to translate in a direction along the longitudinal direction relative to the adjustment mechanism.

7. The computer peripheral mounting device of claim 1, wherein the clamp comprises a macro-adjustment mechanism and the adjustment mechanism comprises a micro-adjustment mechanism for the clamp.

8. A computer peripheral mounting apparatus for connecting a peripheral device to an underlying surface, wherein the underlying surface defines a thickness, the computer peripheral mounting apparatus comprising:
    a fixed tubing extending in a longitudinal direction;
    a clamp coupled to a first end of the fixed tubing, wherein the clamp comprises a first surface and a second surface, and wherein a distance in the longitudinal direction between the first surface and the second surface is configured to be changed from a first distance to a second distance, less than the first distance, in order to clamp the thickness of the underlying surface between the first surface and the second surface;
    an adjustment mechanism positioned at a second end of the fixed tubing, opposite the first end;
    a horizontal support coupled to the fixed tubing between the adjustment mechanism and the clamp, and
    a shaft positioned within the fixed tubing and coupled between the adjustment mechanism and the clamp,
    wherein the adjustment mechanism is configured to rotate around the longitudinal direction relative to the fixed tubing in order to rotate the shaft within the fixed tubing and without the adjustment mechanism nor the shaft translating along the longitudinal direction relative to the fixed tubing,
    wherein rotation of the shaft is configured to cause the distance between the first surface and the second surface to change, and
    wherein the horizontal support comprises an attachment mechanism for a peripheral device.

9. The computer peripheral mounting apparatus of claim 8, wherein the horizontal support is translatable along the fixed tubing between the adjustment mechanism and the clamp and fixable to the fixed tubing by a coupling element.

10. A computer peripheral mounting device for connecting a peripheral device to an underlying surface, wherein the underlying surface defines a thickness, the computer peripheral mounting device comprising:
    a fixed tubing extending in a longitudinal direction;
    a clamp coupled to a first end of the fixed tubing, wherein the clamp comprises a first surface and a second surface, and wherein a distance in the longitudinal direction between the first surface and the second surface is configured to be changed from a first distance to a second distance, less than the first distance, in order to clamp the thickness of the underlying surface between the first surface and the second surface;

an adjustment mechanism positioned at a second end of the fixed tubing, opposite the first end, and a shaft positioned within the fixed tubing and coupled between the adjustment mechanism and the clamp, wherein the adjustment mechanism is configured to rotate around the longitudinal direction relative to the fixed tubing in order to rotate the shaft within the fixed tubing and without the adjustment mechanism nor the shaft translating along the longitudinal direction relative to the fixed tubing, wherein rotation of the shaft is configured to cause the distance between the first surface and the second surface to change; and a horizontal support coupled to the fixed tubing between the adjustment mechanism and the clamp, wherein the horizontal support is translatable along the fixed tubing between the adjustment mechanism and the clamp and fixable to the fixed tubing by a coupling element.

\* \* \* \* \*